(12) United States Patent
Molteni et al.

(10) Patent No.: US 12,554,248 B2
(45) Date of Patent: Feb. 17, 2026

(54) PLANT FOR MELTING AND/OR HEATING METAL MATERIAL, AND METHOD TO SUPPLY ELECTRICAL ENERGY TO SAID PLANT

(71) Applicant: DANIELI AUTOMATION S.P.A., Buttrio (IT)

(72) Inventors: Roberto Molteni, Tradate (IT); Antonello Mordeglia, Bangkok (TH)

(73) Assignee: DANIELI AUTOMATION S.P.A., Buttrio (IT)

( * ) Notice: Subject to any disclaimer, the term of this patent is extended or adjusted under 35 U.S.C. 154(b) by 522 days.

(21) Appl. No.: 17/926,320

(22) PCT Filed: May 20, 2021

(86) PCT No.: PCT/IT2021/050152
§ 371 (c)(1),
(2) Date: Nov. 18, 2022

(87) PCT Pub. No.: WO2021/234752
PCT Pub. Date: Nov. 25, 2021

(65) Prior Publication Data
US 2023/0236573 A1 Jul. 27, 2023

(30) Foreign Application Priority Data

May 21, 2020 (IT) .......................... 102020000011920

(51) Int. Cl.
*G05B 19/4155* (2006.01)
*H02J 3/00* (2006.01)
(Continued)

(52) U.S. Cl.
CPC .......... *G05B 19/4155* (2013.01); *H02J 3/007* (2020.01); *H02J 3/16* (2013.01);
(Continued)

(58) Field of Classification Search
CPC ....... G05B 19/4155; G05B 2219/41354; H02J 3/007; H02J 3/16; H02J 3/38;
(Continued)

(56) References Cited

U.S. PATENT DOCUMENTS 4,220,896 A * 9/1980 Paice ................... H05B 41/392
315/307
5,179,258 A * 1/1993 Arvedi ..................... C21D 9/60
219/645
(Continued)

FOREIGN PATENT DOCUMENTS

CN 2741308 Y 11/2005
CN 208675572 U 3/2019
(Continued)

OTHER PUBLICATIONS

International Preliminary Report of Patentability for corresponding application PCT/IT2021/050152 filed May 20, 2021; Mail date Jun. 2, 2022.
(Continued)

*Primary Examiner* — Charles Cai
(74) *Attorney, Agent, or Firm* — K&L Gates LLP

(57) ABSTRACT

Embodiments concern a plant for melting and/or heating metal material and a corresponding method to supply electrical energy. The plant comprises at least one induction furnace (11) and means (12) for supplying electrical energy to the induction furnace 11), wherein the electric power supply means (12) comprise at least one transformer (13) connected to an alternating current mains power network (14), at least one rectifier (15) located downstream of the
(Continued)

transformer (13), at least one converter (16) located downstream of the rectifier device (15), and at least one coil (17) for melting and/or heating metal material.

8 Claims, 1 Drawing Sheet

(51) Int. Cl.
*H02J 3/007* (2026.01)
*H02J 3/16* (2006.01)
*H02J 3/38* (2006.01)
*H05B 6/04* (2006.01)
*H05B 6/36* (2006.01)
*H05B 6/44* (2006.01)

(52) U.S. Cl.
CPC .................. *H02J 3/38* (2013.01); *H05B 6/04* (2013.01); *G05B 2219/41354* (2013.01); *H02J 2300/10* (2020.01); *H02J 2300/24* (2020.01); *H02J 2300/28* (2020.01); *H05B 6/367* (2013.01); *H05B 6/44* (2013.01)

(58) Field of Classification Search
CPC ............... H02J 2300/10; H02J 2300/24; H02J 2300/28; H02J 2310/10; H02J 1/08; H02J 4/00; H05B 6/04; H05B 6/367; H05B 6/44; H05B 6/067; Y02P 10/25; Y02P 80/10
See application file for complete search history.

(56) References Cited

U.S. PATENT DOCUMENTS

| 5,352,872 | A | * | 10/1994 | Tsuji | ...................... F27D 11/06 219/669 |
| 6,148,019 | A | * | 11/2000 | Fishman | .................. H05B 6/04 219/661 |
| 2009/0273240 | A1 | | 11/2009 | Gurunathan | |
| 2011/0273022 | A1 | | 11/2011 | Dennis | |
| 2012/0267952 | A1 | * | 10/2012 | Ballatine | .................. H02J 7/34 307/26 |

FOREIGN PATENT DOCUMENTS

| DE | 202008012031 U1 | 1/2009 |
| EP | 3361595 A1 | 8/2018 |
| WO | 2016094939 A1 | 6/2016 |
| WO | 2019207609 A1 | 10/2019 |
| WO | 2019207611 A1 | 10/2019 |

OTHER PUBLICATIONS

International Search Report for corresponding application PCT/IT2021/050151 filed May 20, 2021; Mail date Aug. 31, 2021.
International Search Report for corresponding application PCT/IT2021/050152 filed May 20, 2021; Mail date Sep. 13, 2021.

* cited by examiner

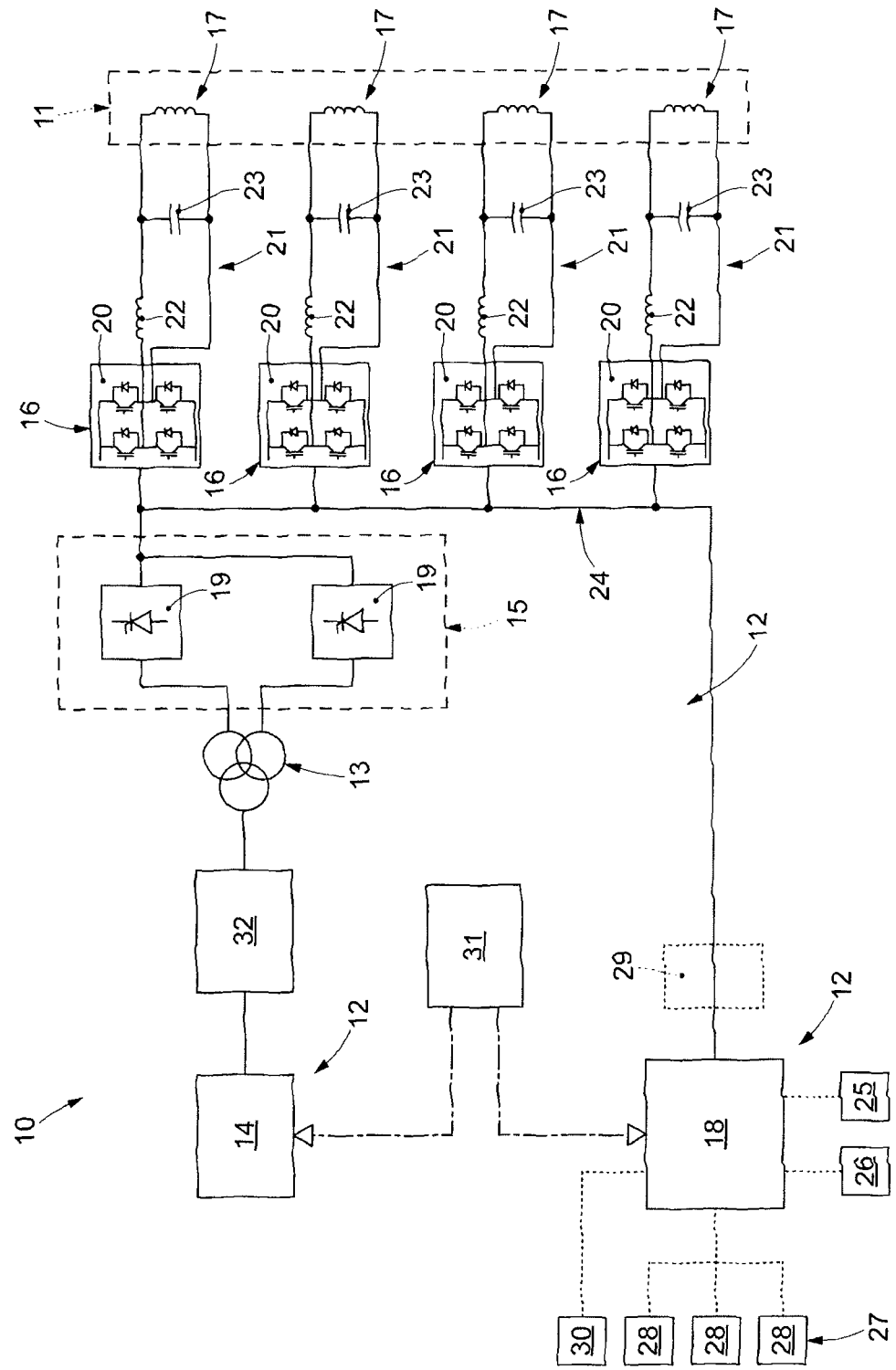

PLANT FOR MELTING AND/OR HEATING METAL MATERIAL, AND METHOD TO SUPPLY ELECTRICAL ENERGY TO SAID PLANT

FIELD OF THE INVENTION

The present invention concerns a plant for melting and/or heating metal material. In particular, the present plant comprises at least one induction furnace which carries out the melting and/or heating of metal material. The present invention also concerns a method to supply electrical energy in a plant for melting and/or heating metal material comprising an induction furnace.

BACKGROUND OF THE INVENTION

Plants for heating and/or melting metal materials are known, comprising induction furnaces into which metal products to be melted or heated are introduced.

Induction furnaces are associated with power supply means that take energy from a mains power network and transmit it to the electrical components of the furnace.

As is known, induction furnaces are used in metallurgy to melt or heat metal materials according to the principle of electromagnetic induction. Induction heating is widely used in the metal industry, and offers several advantages, for example high production speeds, high energy efficiency, heat localized only where needed. Induction furnaces are characterized by low energy consumption or unwanted overheating, high process control and repeatability, excellent quality of the finished product, little maintenance required, easy integration into production lines, great safety as there are no open flames and toxic fumes, reduced sizes and more free spaces.

An induction furnace can comprise, for example, a transformer connected to the alternating current mains power network, a rectifier downstream of said transformer in order to rectify the alternating current at exit from the transformer into direct current, a converter located downstream of the rectifier to transform the direct current at exit from the rectifier into alternating current, and at least one coil to melt and/or heat the metal material that passes through the coil.

The coil, or spiral, generally surrounds a chamber through which the metal material to be heated is made to pass, so that the magnetic field generated uniformly hits the metal product to be heated.

It is also known that melting and/or heating plants, for example used for the production of steel in the steel industry, require a high power supply, usually a few dozen megawatts (MW), depending on the size of the plant and/or the induction furnace used.

To have a sufficient energy supply it is therefore necessary that the melting and/or heating plants are continuously connected to the mains power network. Furthermore, the absorption of three-phase alternating electric current is a function of the production, so the greater the melted material produced by the furnace, the greater the amount of electrical energy that has to be purchased.

One disadvantage of traditional solutions is the need to be constantly connected to the public mains power network.

Another disadvantage is that taking electrical energy from the mains power network can be expensive, particularly in some geographical areas, or it can become expensive following significant socio-economic events, also considerably increasing the estimated supply costs.

Several steel plants are therefore forced, for example, to concentrate production during periods in which the electrical energy supplied by the mains power network has a lower cost.

Furthermore, in the event of a possible black-out of the mains power network, it is necessary to stop the plant and production, with consequent loss of productivity and therefore delay in the delivery of production batches.

Document CN208675572U describes a known heating inductor for a melting furnace, in which the alternating line current is first rectified into direct current and subsequently transformed into alternating current to be fed to the coils of the inductor. Electrical energy is supplied by a traditional mains power network.

Document EP3361595A1 describes an apparatus and a method to accumulate and supply electrical energy to a user, in which the apparatus comprises a mains power network and a renewable energy supply unit connected to an accumulation unit. The primary purpose of the solution is in fact to accumulate the electrical energy supplied by the renewable energy supply unit in order to use it as an alternative to the mains power network.

DE202008012031 describes a control unit for an apparatus to supply electrical energy to a domestic user device, connected to a mains power network, and to energy accumulation devices supplied by a renewable energy source, in which the control unit monitors the condition of the accumulation devices in order to alternatively connect the user device to accumulation devices or to the mains power network.

These last solutions refer in particular to domestic user devices and are not suitable for application in industrial plants, in particular in plants for heating and/or melting metal materials, which require very high supply power, that is, in the order of dozens of megawatts.

There is therefore a need to perfect a plant for heating and/or melting metal materials comprising an induction furnace which can overcome at least one of the disadvantages of the state of the art.

In particular, one purpose of the present invention is to provide a plant for melting and/or heating metal materials that can operate at least partly independently of the mains power network, so as to reduce energy supply costs and therefore overall production costs.

One purpose is also to reduce the risk of shutdown of the processing plants due to black-out phenomena on the mains power network, which in the most serious cases can last even several days.

Another purpose is to reduce the use of energy from the public mains power network, reducing the consumption effected on this network.

Another purpose is to perfect a method to power a plant for heating and/or melting metal material, comprising an induction furnace, which allows to limit the supply of electrical energy from the mains power network.

It is also a purpose to allow the plant for heating and/or melting metal material to function during the entire day and/or night.

Another benefit and advantage provided by the present invention is also that it allows to reduce $CO_2$ emissions, or other related emissions, if the production of energy by the public network is not completely generated by renewable energy sources.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, a plant for melting and/or heating metal material according to the present invention comprises at least one induction furnace and electric power supply means; the electric power supply means comprise at least one transformer connected to an alternating current mains power network, at least one rectifier located downstream of the transformer to transform the alternating current at exit from the transformer into direct current, at least one converter located downstream of the rectifier to transform the direct current at exit from the rectifier device into alternating current, and at least one coil for melting and/or heating metal material.

According to one aspect of the invention, the electric power supply means also comprise at least one alternative energy source, different and independent from the mains power network, connected to the induction furnace upstream of the converter and selectively usable to supply power energy to the induction furnace in addition, or as an alternative, to the electrical energy supplied by the mains power network.

Thanks to the alternative energy source, it is possible to at least partly power the induction furnace independently from the mains power network, and possibly allow at least a temporary disconnection of the melting and/or heating plant from the mains power network, or in any case reduce the supply of energy from the mains power network as a function of the period of the day, possibly limiting it to the times of the day when it is less expensive.

Furthermore, the presence of the alternative energy source allows to use the melting and/or heating plant even in the event of malfunctions, or blackouts of the mains power network.

Since the alternative energy source can supply electrical energy to the induction furnace even at the same time as the mains power network, the power supply means allow to obtain a high versatility in the regulation of the electrical energy that is supplied on each occasion to the induction furnace, allowing to optimize the supply of electrical energy both as a function of the requests or variations of the load to be powered, and also in order to minimize the withdrawal from the mains power network to minimize costs.

The alternative energy source can be connected to the induction furnace by means of at least one direct current connection system connected upstream of the converter, for example a so-called "DC-Link", suitable to accumulate and filter electrical energy and suitable to guarantee better reliability and quality of the power supply to the converter device.

The induction furnace can also comprise at least one regulation circuit, located downstream of the converter and upstream of the coil, and configured to reduce the reactive power and transfer the maximum active power to the coil.

Moreover, the induction furnace, in some embodiments, can comprise a plurality of coils and a plurality of corresponding converters located upstream of each of such coils.

The alternative energy source can comprise a renewable energy source selected from a hydroelectric power plant, a wind power plant or a photovoltaic solar plant.

The present plant can also comprise at least one accumulation device positioned between the at least one alternative energy source and the induction furnace, and configured to allow the accumulation of the electrical energy produced by the alternative energy source when it is not used to power the induction furnace.

The energy accumulated can then be used at a later time, for example when the alternative energy source is not available, or fails to supply sufficient energy.

The alternative energy source can comprise a non-renewable energy source, configured to obtain electrical energy by burning fossil fuels, wherein the non-renewable energy source is selected from a group comprising gas turbines, or auxiliary current generators.

In some embodiments, the present plant can also comprise a management unit configured to select one, the other, or both, between the mains power network and the alternative energy source as a function of one or more operating parameters.

In particular, the management unit can be configured to monitor one or more parameters between the functioning status, the quality, the quantity and/or the cost of the electrical energy available from the mains power network and from the at least one alternative energy source, and the quantity of energy required by the induction furnace and select one, the other, or both in order to supply electrical energy to the induction furnace at least as a function of the respective functioning status and overall energy costs.

One advantage is to be able to maintain the operation of the high-power load, for example in the event of lower availability of energy from the at least one alternative energy source, or in the event of a black-out on the public mains power network.

Advantageously, the management unit can detect one or more parameters between availability of energy supplied by the networks, energy costs, and extent of the integration with the energy available from the at least one alternative energy source to cover the energy requirement of the load.

In this way, it is possible to choose on each occasion the most appropriate supply energy source, that is, the energy supplied by the mains power network, or the energy supplied by the at least one alternative energy source, also on the basis of energy costs. This therefore prevents having to reduce production, or shut down the processing plants, in cases of energy shortage, or excessive cost thereof.

Furthermore, the invention includes a method to supply electrical energy in a plant for melting and/or heating metal materials, comprising at least one induction furnace and means for supplying electrical energy to the induction furnace. The method provides to supply electrical energy to the induction furnace in addition, or as an alternative, to the electrical energy supplied by the mains power network, by means of at least one alternative energy source, different and independent from the mains power network and associated with the induction furnace.

The present method can also provide to detect and/or monitor one or more parameters between functioning status, energy availability, and cost of the energy supplied by the mains power network and the alternative energy source and the quantity of electrical energy required by the induction furnace and determine whether to use one, the other, or both, between the mains power network and the alternative energy source in order to power the induction furnace, at least as a function of the status detected and/or the quantity of energy required by the induction furnace.

BRIEF DESCRIPTION OF THE DRAWINGS

These and other aspects, characteristics and advantages of the present invention will become apparent from the following description of some embodiments, given as a non-restrictive example with reference to the attached drawing wherein:

FIG. 1 is a diagram of a plant for melting and/or heating metal material according to the present invention.

DETAILED DESCRIPTION OF SOME EMBODIMENTS

We will now refer in detail to one possible embodiment of the invention, of which one example is shown in the attached drawing. This example is supplied by way of illustration of the invention and shall not be understood as a limitation thereof.

With reference to FIG. 1, a plant 10 according to the present invention for melting and/or heating metal material comprises at least one induction furnace 11 and means 12 for supplying electrical energy to the induction furnace 11.

The electric power supply means 12 comprise at least one transformer 13 connected to an alternating current mains power network 14, at least one rectifier 15 located downstream of the transformer 13 to transform the alternating current at exit from the transformer 13 into direct current, at least one converter 16 located downstream of the rectifier 15 to transform the direct current at exit from the rectifier device 15 into alternating current, and at least one coil 17 for melting and/or heating metal material, for example a metal item that passes through the coil 17.

Between the rectifier device 15 and the converter 16 there can also be a direct current connection system 24, also called DC Link, suitable to accumulate and filter the electrical energy and suitable to guarantee a better reliability and quality of the power supply to the converter 16.

The electric power supply means 12 also comprise at least one alternative energy source 18, different and independent from the mains power network 14, connected to the induction furnace 11 upstream of the converter device 16 and configured to supply power energy to the induction furnace 11 in addition, or as an alternative, to the electrical energy supplied by the mains power network 14.

The mains power network 14 can, for example, supply high voltage, in particular alternating current, electrical energy having predefined voltage, current and network frequency values.

Downstream of the mains power network 14 there is provided a high voltage/medium voltage (HV/MV) transformer 32 configured to transform high voltage energy into medium voltage energy.

Downstream of the transformer 32 there is provided the transformer 13 which can be a medium voltage/medium voltage (MV/MV) transformer, configured to transform medium voltage energy into medium voltage values suitable to power the induction furnace 11.

The transformer 13 can be provided with transformer secondaries disposed in a star or triangle, with offset phases in order to obtain an alternating wave that yields a better result in terms of rectification by the rectifier device 15.

The rectifier device 15 can comprise, for example, a pair of thyristor bridges 19 or a diode bridge.

In accordance with possible solutions, the rectifier device 15 comprises devices selected from a group comprising Diodes, SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor) and IGBT (Insulated-Gate Bipolar Transistor).

The converter device 16 can be, for example, an inverter comprising transistors 20, for example IGBT bridges, or insulated gate bipolar transistors, as shown. According to possible solutions, the converter device 16 can comprise devices selected, for example, in a group comprising SCR (Silicon Controlled Rectifier), GTO (Gate Turn-Off thyristor), IGCT (Integrated Gate-Commutated Thyristor), MCT (Metal-Oxide Semiconductor Controlled Thyristor), BJT (Bipolar Junction Transistor), MOSFET (Metal-Oxide Semiconductor Field-Effect Transistor), and IGBT (Insulated-Gate Bipolar Transistor).

Downstream of the converter 16 and upstream of the coil 17, there can be provided a regulation circuit 21 configured to reduce the reactive power and transfer the maximum active power to the coil 17. The regulation circuit 21 can comprise at least one inductor 22 and at least one capacitor 23, or a bank of capacitors 23, which are able to reduce the reactive power.

As can be seen in FIG. 1, the present induction furnace 11 can comprise a plurality of induction coils 17, each of which can be passed through by an electric current in order to generate a magnetic field necessary to heat a metal product to be subjected to melting or heating.

Each of the coils 17 can be associated with a corresponding converter device 16 located upstream of the coil 17.

Each of the converter devices 16 can be connected to the same direct current connection system 24.

The alternative energy source 18 is preferably connected to the induction furnace 11 by means of the at least one direct current connection system 24, located between the output of the rectifier device 15 and the input of the converter device 16.

The direct current connection system 24 can be, as mentioned, a so-called "DC-Link" circuit or connection, suitable to accumulate and filter the electrical energy and suitable to guarantee a better reliability and quality of the power supply to the converter device 16 which requires a stable and clean direct voltage at entry.

The direct current connection system 24 can also be configured to store direct electrical energy and generate a separation between the converter 16 and the rectifier 15, and therefore with the mains power network 14, or the alternative energy source 18 which are connected upstream thereof. In this way, possible power fluctuations are partly filtered by the direct current connection system 24, reducing their impact on the side of the mains power network 14 and/or the alternative energy source 18.

The alternative energy source 18 can comprise one or more renewable energy sources selected from a hydroelectric power plant 25, a wind power plant 26 or a photovoltaic solar plant 27, provided for example with a plurality of photovoltaic panels 28.

The alternative energy source 18 can supply direct current or alternating current and, in the latter case, the source 18 can provide its own converter devices, or other, to allow the connection with the direct current connection system 24 associated with the induction furnace 11.

The plant 10 can also comprise an accumulation device 29 positioned between the alternative energy source 18 and the induction furnace 11 and configured to allow the accumulation of the electrical energy produced by the alternative energy source 18 when it is not used to power the induction furnace 11.

In this case, the induction furnace 11 can be powered both directly by the electrical energy generated by the alternative energy source 18 and also indirectly by means of the accumulation device 29, for example when the alternative energy source 18 is not available.

The accumulation device 29 can be used in addition, or as an alternative, to the mains power network 14.

The alternative energy source 18 can comprise one or more non-renewable energy sources 30, configured to obtain electrical energy by burning fossil fuels, wherein the non-renewable energy source(s) 30 is/are selected in a group comprising gas turbines, or auxiliary current generators.

The plant 10 advantageously can provide a management unit 31, which can comprise, for example, one or more processors.

The management unit 31 is configured to select one, the other, or both, between the mains power network 14 and the alternative energy source 18, to supply electrical energy to the induction furnace 11 as a function of one or more parameters. In this way, it is possible to increase or reduce the electrical energy supplied by one or the other, both in relation to operational needs and also in relation to the costs of the electrical energy.

The management unit 31 can be configured to monitor one or more parameters between the functioning status, the quality, the quantity and/or the cost of the electrical energy available from the mains power network 14 and from the at least one alternative energy source 18.

The management unit 31 can also be configured to monitor the quantity of energy required by the induction furnace 11 and select one, the other, or both, between the mains power network 14 and the alternative energy source 18, in order to supply electrical energy to the induction furnace 11 at least as a function of the respective functioning status and the overall energy costs.

Substantially, the present method to supply electrical energy in an induction furnace 11 of a plant 10 for melting and/or heating metal materials, provides to supply electrical energy to the induction furnace 11 in addition, or as an alternative, to the electrical energy supplied by the mains power network 14, by means of at least one alternative energy source 18, different and independent from the mains power network 14 and associated with the induction furnace 11.

The present method can provide to detect and/or monitor one or more parameters between functioning status, energy availability, and cost of the energy supplied by the mains power network 14 and the alternative energy source 18 and the quantity of electrical energy required by the induction furnace 11, and determine whether to use one, the other, or both, between the mains power network 14 and the alternative energy source 18 to power the induction furnace 11, at least as a function of the status detected and/or the quantity of energy required by the induction furnace.

In the event that the accumulation device 29 is also present, the power supply method can also provide to monitor the functioning status, that is, the total quantity of charge present therein, and determine whether and how to use the energy supplied by the accumulation device 29 in addition and/or as an alternative to the energy supplied by the mains power network 14 and/or by the alternative energy source 18.

It is clear that modifications and/or additions of parts may be made to the plant 10 for melting and/or heating metal material and to the method to supply electrical energy as described heretofore, without departing from the field and scope of the present invention, as defined by the claims.

The invention claimed is:

1. A plant for melting and/or heating metal material, comprising:
an induction furnace;
electric power supply means comprising a transformer connected to an alternating current mains power network;
a rectifier located downstream of said transformer;
a converter located downstream of said rectifier; and
a coil for melting and/or heating metal material;
wherein said electric power supply means comprise an alternative energy source connected to said induction furnace by means of a direct current connection system located upstream of said converter and able to supply power energy to said induction furnace in addition, or as an alternative, to electrical energy supplied by said mains power network, wherein the direct current connection system is a DC-link circuit configured to accumulate and filter electrical energy to provide a stable and clean direct voltage to an input of the converter;
wherein said plant further comprises a management unit configured to select one, or the other, or both between said mains power network and said alternative energy source as a function of one or more parameters; and
wherein said induction furnace comprises a regulation circuit, located downstream of said converter and upstream of said coil and configured to reduce reactive power and transfer maximum active power to said coil, said at least one regulation circuit comprising at least one inductor and at least one capacitor, or a bank of capacitors.

2. The plant as in claim 1, wherein said induction furnace comprises a plurality of coils and a plurality of corresponding converters located upstream of each of said coils.

3. The plant as in claim 1, wherein said alternative energy source comprises a renewable energy source comprising one or more of a hydroelectric power plant, a wind power plant or a photovoltaic solar plant.

4. The plant as in claim 1, further comprising an accumulation device positioned between said alternative energy source and said induction furnace to allow the accumulation of the electrical energy produced by the alternative energy source when it is not used to power said induction furnace.

5. The plant as in claim 1, wherein said alternative energy source comprises a non-renewable energy source, configured to obtain electrical energy by burning fossil fuels, wherein said non-renewable energy source comprises one or more of gas turbines, or auxiliary current generators.

6. The plant as in claim 1, wherein said management unit is configured to monitor one or more parameters between a functioning status, a quality, a quantity and/or a cost of the electrical energy available from said mains power network and from said alternative energy source, and a quantity of energy required by said induction furnace and select one, the other, or both in order to supply electrical energy to said induction furnace as a function of the respective functioning status and overall energy costs.

7. A method to supply electrical energy in a plant for melting and/or heating metal materials, comprising an induction furnace and electric power supply means for supplying electrical energy to said induction furnace, wherein said electric power supply means comprise a transformer connected to an alternating current mains power network, a rectifier located downstream of said transformer to transform the alternating current at exit from the transformer into direct current, a converter located downstream of said rectifier to transform the direct current at exit from said rectifier into alternating current, and a coil for melting and/or heating metal material, and wherein said induction furnace comprises a regulation circuit, located downstream of said converter and upstream of said coil and configured to reduce reactive power and transfer maximum active power to said coil, said at least one regulation circuit comprising at least one inductor and at least one capacitor, or a bank of capacitors, said method comprising:
- providing electrical energy to the induction furnace in addition, or as an alternative, to electrical energy supplied by the mains power network, by means of an alternative energy source, different and independent from the mains power network and associated with said induction furnace; and
- selecting one, the other, or both between said mains power network and said alternative energy source as a function of one or more parameters, wherein said alternative energy source is connected to said induction furnace by means of at least one direct current connection system located upstream of said converter, and wherein said at least one direct current connection system comprises a DC-link circuit configured to accumulate and filter electrical energy to provide a stable and clean direct voltage to an input of the converter.

8. The method as in claim 7, further comprising detecting and/or monitoring one or more parameters between functioning status, energy availability, and cost of the energy supplied by said mains power network and said alternative energy source and the quantity of electrical energy required by said induction furnace and determining whether to use one, the other, or both, between said mains power network and said alternative energy source in order to power said induction furnace, as a function of the status detected and/or the quantity of energy required by said induction furnace.

* * * * *